Oct. 10, 1950
P. W. REDCAY
2,524,834
VOLTAGE CONTROL CIRCUITS
Filed Dec. 20, 1944
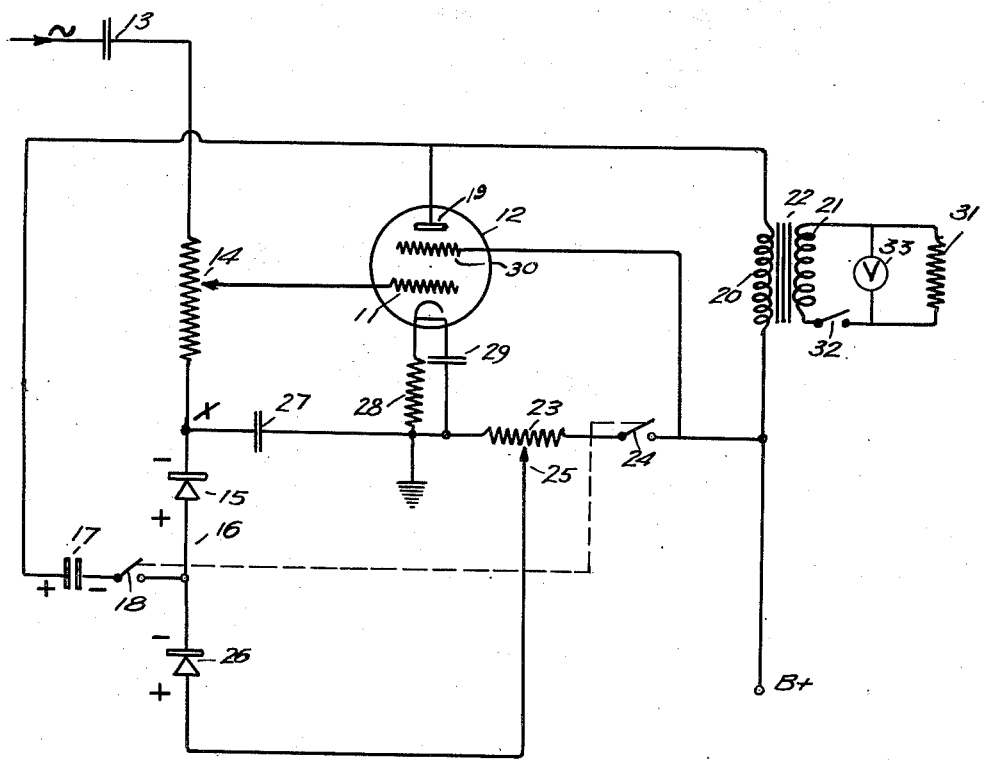
INVENTOR
PAUL W. REDCAY
By William D. Hall,
ATTORNEY Patented Oct. 10, 1950

2,524,834

UNITED STATES PATENT OFFICE 2,524,834

VOLTAGE CONTROL CIRCUITS

Paul W. Redcay, Washington, D. C., assignor to the United States of America as represented by the Secretary of War Application December 20, 1944, Serial No. 569,073

4 Claims. (Cl. 179—171)

(Granted under the act of March 3, 1883, as amended April 30, 1928; 370 O. G. 757)

The invention described herein may be manufactured and used by or for the Government for governmental purposes, without the payment of any royalty thereon.

This invention relates to means and methods for supplying current to the filament of an electronic tube without using a filament battery.

A primary object is to supply current, at substantially constant R. M. S. alternating voltage, for electronic tubes used in radio or other military devices. This voltage is derived from a small wind driven generator built into the device to furnish plate or B voltage as well as filament current.

A further object is to provide a circuit for automatically regulating the filament voltage by means of simple changes in or additions to existing circuits.

Another object is to provide a filament voltage regulation circuit to prevent filament burn-outs in case of improper load, to prevent meter overloads if the filaments of a test model are accidentally disconnected, and to automatically compensate for variable loads on the secondary of a connected transformer.

Other objects will appear in the specification.

The single figure of the drawing shows a circuit diagram of my automatic voltage control filament supply invention. Electrical pulsations from an audio oscillator, not shown, are fed to the control grid 11 of tetrode 12 through condenser 13 and part of potentiometer resistance 14 connected between condenser 13 and the negative terminal of rectifier 15 which preferably consists of a stack of selenium or copper oxide rectifier buttons. The negative terminal of similar rectifier 26 is connected to the positive terminal of rectifier 15 by means of conductor 16 to which the negative terminal of condenser 17 is also connected through switch 18. The positive terminal of condenser 17 is connected to the plate 19 of tube 12. The primary 20 of transformer 22 is connected between plate 19 and the positive terminal of the B supply which may be a generator. Potentiometer 23, connected between the ground of tube 12 and the B+ terminal, has switch 24 connected as shown. The potentiometer slide contact 25 is connected with the positive terminal of rectifier 26. The grid-ground circuit includes condenser 27 in series, and resistance 28 and by-pass condenser 29. Screen grid 30 is connected to the positive plate voltage supply terminal B+ which is also connected to ground through resistance 23.

The secondary 21 of transformer 22 is connected in series with filament load resistor 31 and switch 32. Switches 18 and 24 are tied together and are therefore thrown simultaneously to "off-on" positions.

In the operation of the device the alternating voltage supplied by an audio oscillator at some definite frequency is, through the agency of amplifier tube 12 and transformer 22, fed to filament or other load resistor 31. The filament voltage appearing across the secondary 21 of transformer 22 is adjusted in value by means of potentiometers 14 and 23. The rectifiers 15 and 26, on conjunction with the associated elements, constitute a voltage doubling circuit to provide the necessary negative bias automatically to adjust the output voltage. Condenser 27 is used as a filter.

With switches 18 and 24 in "off" position, i. e. open and a direct current voltage applied between B+ and ground, the amplifier operates in a normal manner and potentiometer 14 is adjusted to vary the voltage on grid 11 until the secondary 21 of transformer 22 supplies the desired voltage to the load 31, as indicated by voltmeter 33. Switches 18 and 24 are then closed with the control arm 25 of potentiometer 23 set at the ground end of the resistance. The control arm 25 of potentiometer 23 is then adjusted until the filament voltage, as indicated by instrument 33, again reaches the desired value. The bias voltage at point X should then be the same as before switches 18 and 24 were closed with respect to ground. The reason for this is that the alternating voltage component appearing at the anode of tube 12 is passed to the rectifier buttons through condenser 17 and, as a result of the rectifying action of rectifier 26, the positive half cycle charges this condenser to full peak value. Because of the way in which rectifiers 26 and 15 are connected, this charge is held during the negative half of the cycle by the condenser plate connected to conductor 16. Thus during the negative half of the anode voltage cycle the side of condenser 17 connected to lead 16 is forced to go more negative since the voltage during the negative half of the cycle is superimposed on the voltage due to the held charge. The resulting voltage, therefore, which is developed at lead 16 is substantially twice the amplitude value of the alternating current component of the anode voltage. This negative voltage is passed on by rectifier 15 to grid 11 of tube 12. To bring about bias conditions which exist after the initial adjustment of the circuit, that is, when switches 18 and 24 are open, it is necessary to introduce a positive voltage into the grid return circuit to balance out the negative voltage which has been developed as a result of the insertion of rectifiers 15 and 26. This is accomplished by moving arm 25 of potentiometer 23 to the right until the voltmeter reads the prescribed value. With this adjustment made, the bias potential on grid 11 will be the same as that after the initial adjustment of the circuit. The circuit is now adjusted for operation as a regulated filament supply.

It will be noted that the polarities of the rectifiers 15 and 26 are so aligned that current passes through them in one direction but not in the opposite direction.

The regulation of the filament voltage takes place in the following manner. Suppose that filament load 31 is reduced so that increased current flows in the circuit to cause a smaller net voltage to be applied to the filament. In that case the flow of increased secondary current causes a reduction of impedance in the primary 20 of transformer 22 so that the impedance drop in the primary will be reduced. This results in a rise of potential at anode 19 so that an increased negative potential will be developed on conductor 16. Since this negative voltage now exceeds the positive voltage due to the setting of arm 25 of potentiometer 23, an increased negative voltage will result at point X and will be applied through rectifier 15 to grid 11 to reduce the current through the primary 20 of transformer 22 so that a reduced voltage will be induced in the secondary or filament circuit. In like manner but in a reverse sense, the filament voltage is increased if the filament load resistance is increased.

It will be apparent that while a direct current potential was assumed to be applied to the B+ terminal, the circuit will function effectively with an alternating current supply. In such instance tube 12 will also act as a half-wave rectifier. However, the regulating action described above will take place to keep the load supplied with power at the desired voltage.

This voltage regulation system is particularly desirable for compensating for a condition in which a number of tubes are connected in parallel and some of the filaments are accidentally on open circuit. It is of value also in compensating for lack of uniformity in filament resistance for various tubes and in preventing meter overloads.

I claim:

1. A voltage supply and regulation circuit comprising a transformer having a primary and secondary portion, a vacuum tube having at least three electrodes, one side of said transformer primary connected to the anode of said vacuum tube, means connecting the remaining side of said transformer primary through a resistance to ground, a first rectifier connected to a variable tap on said resistance, a second rectifier in series with said first rectifier, means connecting the midpoint linking said two rectifiers to said anode through a condenser and means to feed a fluctuating voltage to the grid of said vacuum tube through a condenser and variable resistance, the end of said variable resistance being connected to said second rectifier.

2. A voltage supply and regulation circuit comprising a vacuum tube including cathode, grid and anode electrodes, means to feed a fluctuating voltage to the grid, a load coupled in the anode circuit of said tube, a source of direct current potential connected to the anode through the load coupling, and means connected to the load coupling for changing the grid bias of said tube in response to changes in anode current, said last-mentioned means including rectifier means connected to the grid and responsive to the anode current to supply a negative direct current potential to the grid, and also including a variable resistor connected to the aforementioned source of potential and to said rectifier means for introducing a positive direct current potential component in the grid circuit.

3. A voltage supply and regulation circuit comprising a vacuum tube including cathode, grid and anode electrodes, means to feed a fluctuating voltage to the grid, a load coupled in the anode circuit of said tube, a source of electric potential connected to the anode through the load coupling, and means connected to the load coupling for changing the grid bias of said tube in response to changes in the anode current, said last-mentioned means including a pair of rectifiers connected in series to the grid, a condenser joining the anode and the lead connecting the rectifiers, said condenser and rectifiers forming a voltage doubler responsive to the anode current to supply a negative direct current potential to the grid, and also including biasing means connected to the aforementioned source of potential and to said rectifiers for introducing a second component of electric potential in the grid circuit.

4. A voltage supply and regulation circuit comprising a vacuum tube including cathode, grid and anode electrodes, means to feed a fluctuating voltage to the grid, a load coupled in the anode circuit of said tube, a source of direct current potential connected to the anode through the load coupling, and means connected to the load coupling for changing the grid bias of said tube in response to changes in the anode current, said last-mentioned means including a pair of metallic oxide rectifiers connected in series to the grid, a condenser joining the anode and the lead connecting said rectifiers, said condenser and rectifiers forming a voltage doubler responsive to the anode current to supply a negative direct current potential to the grid, and also including a variable resistor connected to the aforementioned source of potential and to said rectifiers for introducing a second component of direct current potential in the grid circuit.

PAUL W. REDCAY.

REFERENCES CITED

The following references are of record in the file of this patent:

UNITED STATES PATENTS

| Number | Name | Date |
| --- | --- | --- |
| 2,172,476 | Koch | Sept. 12, 1939 |
| 2,203,485 | Bentley | June 4, 1940 |
| 2,207,259 | Koch | July 9, 1940 |
| 2,210,394 | Braden | Aug. 6, 1940 |